US008313383B1

(12) United States Patent
Bordier

(10) Patent No.: US 8,313,383 B1
(45) Date of Patent: Nov. 20, 2012

(54) SYSTEM FOR PLAYING AN INTERACTIVE VOTER CHOICE GAME

(76) Inventor: Nancy Bordier, Washington, DC (US)

(*) Notice: Subject to any disclaimer, the term of this patent is extended or adjusted under 35 U.S.C. 154(b) by 0 days.

(21) Appl. No.: 13/352,460

(22) Filed: Jan. 18, 2012

(51) Int. Cl.
*A63F 13/00* (2006.01)
(52) U.S. Cl. ................ 463/42; 463/40; 463/41
(58) Field of Classification Search ............ 273/302; 463/1–6, 40–42; 705/1.1, 7.11, 7.12, 7.29, 705/7.32
See application file for complete search history.

(56) References Cited

U.S. PATENT DOCUMENTS

| | | | |
|---|---|---|---|
| 4,625,970 A | 12/1986 | Childs et al. | |
| 5,137,279 A | 8/1992 | Murphy et al. | |
| 5,632,488 A | 5/1997 | Sturm et al. | |
| 5,769,715 A | 6/1998 | Brown | |
| 7,953,628 B2 | 5/2011 | Bordier | |
| 2008/0284103 A1* | 11/2008 | Cohen | 273/302 |

OTHER PUBLICATIONS

"Wikipedia, Congressional stagnation in the United States", http://en.wikipedia.org/wiki/Congressional_stagnation_in_the_United_States, retrieved Jan. 8, 2012.
Kulish, Nicholas. , As Scorn for Vote Grows, Protests Surge Around Globe, New York Times, Sep. 27, 2011. http://www.nytimes.com/2011/09/28/world/as-scorn-for-vote-grows-protests-surge-around-globe.html, retrieved Jan. 11, 2012).
Pew Research, Distrust, Discontent, Anger and Partisan Rancor: The People and Their Government, Apr. 18, 2010, http://pewresearch.org/pubs/1569/trust-in-government-distrust-discontent-anger-partisan-rancor, retrieved Jan. 15, 2012.).
Rasmussen Reports. "53% Say Elections are Rigged to Help Incumbents in Congress", Rasmussen Reports, May 12, 2011. http://www.rasmussenreports.com/public_content/politics/general_politics/may_2011/53_say_elections_are_rigged_to_help_incumbents_in_congress, retrieved Jan. 15, 2012.).
Salant, Jonathan D. "Few Want Members of Congress Re-Elected, Poll Finds (Update1)", Bloomberg News, Feb. 12, 2010, http://www.bloomberg.com/apps/news?pid=newsarchive&sid=aEsowrIv31_g, retrieved Jan. 8, 2012;.
Shirky, Clay. Here Comes Everybody: The Power of Organizing without Organizations, Penguin, 2008.).
Wikipedia, "Voter Turnout", http://en.wikipedia.org/wiki/Voter_turnout, retrieved Jan. 7, 2012.).

* cited by examiner

*Primary Examiner* — Ronald Laneau
*Assistant Examiner* — Ross Williams

(57) ABSTRACT

A system for playing an interactive voter choice game involving strategy, chance, a computer network, a game board, a plurality of players using remote terminals to access the game, electronic databases and a voting utility, in which players compete to develop strategies for setting legislative agendas and building voting blocs and coalitions of voting blocs to elect a candidate for public office to represent a fictive electoral district.

20 Claims, 2 Drawing Sheets

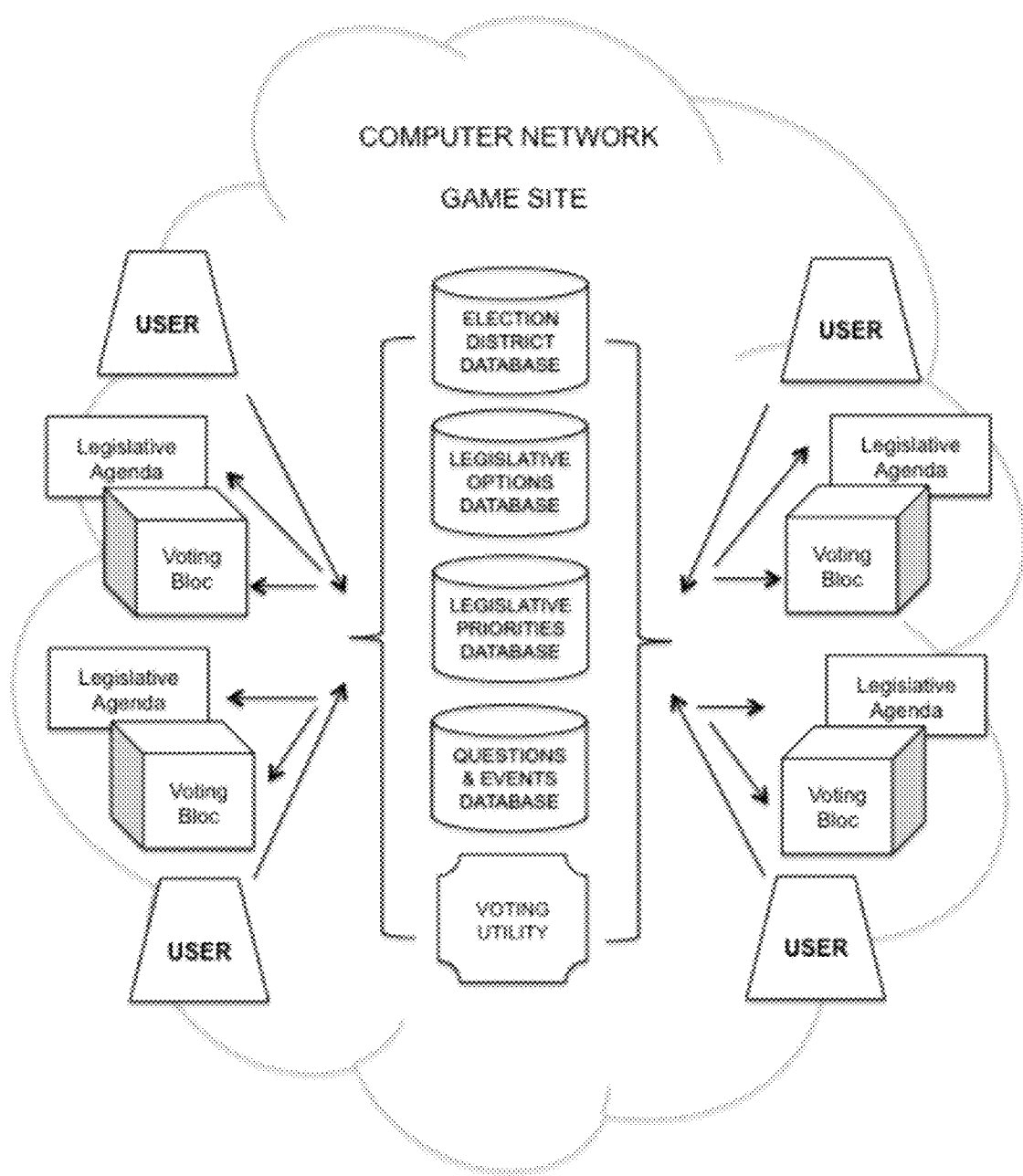

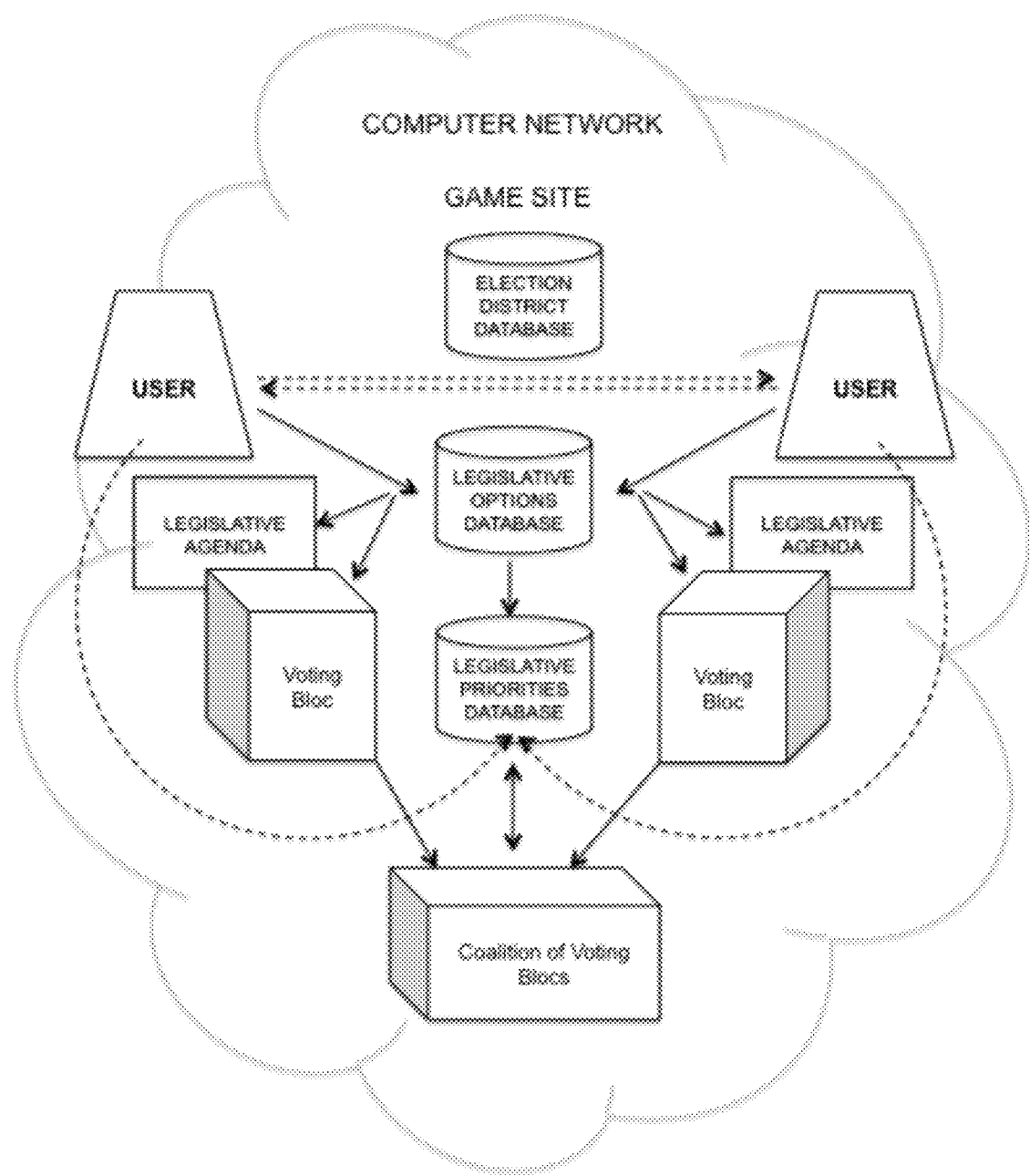

SYSTEM FOR PLAYING AN INTERACTIVE VOTER CHOICE GAME

CROSS-REFERENCE TO RELATED APPLICATIONS

This application is related to the Interactive Voter Choice System, U.S. Pat. No. 7,953,628, issued May 31, 2011.

BACKGROUND OF THE INVENTION (1) Field of the Invention

The invention is a system for playing an interactive voter choice card and board game involving strategy and chance, a computer network, a game board, and a plurality of players using remote terminals to access the game board, electronic databases and a voting utility to develop competing strategies to build winning voting blocs to elect a candidate for public office to represent a fictive election district.

(2) Description of the Related Art

Studies show a trend toward decreasing voter turnout in most established democracies since the 1960s. (See "Voter Turnout", Wikipedia http://en.wikipedia.org/wiki/Voter_turnout, retrieved Jan. 7, 2012.) Although computer networks and the internet have the potential to foster increased participation in elections, they do not appear to have exerted a significant effect on this downward trend. Effective computer- and web-based inventions designed to leverage this potential have yet to emerge, largely due to the complexity of electoral processes and the many factors and obstacles that decrease citizen participation in these processes and influence over their outcomes. Existing games to enhance civic engagement are limited by their focus on teaching voters more about the intricacies of electoral processes and institutions that frustrate voters and thwart civic participation in elections.

This inventor's recently patented Interactive Voter Choice System (U.S. Pat. No. 7,953,628) is designed to increase citizen participation in elections and influence over their outcomes by enabling voters to take action before elections to circumvent these factors and obstacles. It does this by providing voters access to unique databases to set collective legislative agendas and build voting blocs and electoral coalitions to run and elect their own candidates. The present application provides voters an amusing multiparty game for learning how to increase their influence over elections and their outcomes by using core features of the Interactive Voter Choice System to overcome the factors and obstacles that thwart their participation and diminish their influence.

Among the most significant obstacles to voter participation in elections is the fact that many voters believe their votes do not make any difference. Research shows that voters in the U.S., for example, think elected representatives, and often the political parties that back them, tend to pass legislation favoring the special interests that finance their electoral campaigns rather than their constituents. (See: Jonathan D. Salant, "Few Want Members of Congress Re-Elected, Poll Finds (Update1)", Bloomberg News, Feb. 12, 2010, http://www.bloomberg.com/apps/news?pid=newsarchive&sid=aEsowrlv31_g, retrieved Jan. 8, 2012; Pew Research, *Distrust, Discontent, Anger and Partisan Rancor: The People and Their Government,* Apr. 18, 2010, http://pewresearch.org/pubs/1569/trust-in-government-distrust-discontent-anger-partisan-rancor, retrieved Jan. 15, 2012.)

Another factor contributing to citizens' lack of participation in elections is the fact that laws governing elections, campaign financing, and the establishment of election district boundaries, often make it difficult for new candidates to run for office and defeat incumbents. (See "Congressional stagnation in the United States", Wikipedia, http://en.wikipedia.org/wiki/Congressional_stagnation_in_the_United_States, retrieved Jan. 8, 2012.) Laws preventing new candidates from having a fair chance to win elections prompt dissatisfied voters to stay at home and not vote at all when they see there are no new candidates on the ballot running against incumbents with legislative track records they find unsatisfactory. (See "53% Say Elections are Rigged to Help Incumbents in Congress", Rasmussen Reports, May 12, 2011. http://www.rasmussenreports.com/public_content/politics/general_politics/may_2011/53_say_elections_are_rigged_to_help_incumbents_in_congress, retrieved Jan. 15, 2012.)

While these obstacles render many voters inactive, they can exert an opposite effect on other voters. Research has found that voters' lack of confidence in elections and elected lawmakers appears to be leading many to conclude they have no choice but to take action outside traditional electoral and legislative processes. (See Nicholas Kulish, *As Scorn for Vote Grows, Protests Surge Around Globe,* New York Times, Sep. 27, 2011. http://www.nytimes.com/2011/09/28/world/as-scorn-for-vote-grows-protests-surge-around-globe.html, retrieved Jan. 11, 2012).

One way to prevent frustrated voters from deciding not to participate in elections, or resorting to actions outside electoral processes that might increase rather than decrease tensions, is to provide all voters of all persuasians new ways to increase their influence over elections by enabling them to run and elect their own candidates to enact legislative agendas set by the voters who elected them. Computer networks like the internet can help voters in this regard because their multiparty communication capabilities enable large numbers of voters to communicate with each other and organize online. (See Clay Shirky, *Here Comes Everybody: The Power of Organizing without Organizations,* Penguin, 2008.) At this time, however, computer networks do not appear to have reversed the trend for more voters to become apathetic or seek redress of their grievances outside electoral processes.

Moreover, networks like the internet have also proved to be largely inadequate when it comes to helping voters agree on what legislation they want enacted and which candidates they want to run for public office and elect to enact their legislative priorities. These differences prevent them from aligning in favor of common legislative agendas and candidates. Unless voters can build consensus among themselves on their legislative priorities and build voting blocs and electoral coalitions to elect candidates to enact their priorities, voters' influence over electoral and legislative processes and their outcomes is unlikely to increase. This inventor's Interactive Voter Choice System (U.S. Pat. No. 7,953,628) provides voters unique web-based tools to address these unmet needs. The present application for a "system for playing an interactive voter choice game" provides voters of all persuasions an amusing game of strategy and chance to help them learn how to use similar tools to take advantage of computer networks, the internet and electronic data processing techologies increase their influence over elections and their outcomes.

BRIEF SUMMARY OF THE INVENTION

Studies show trends toward decreasing voter turnout in most established democracies since the 1960s, accompanied by decreasing voter confidence that their votes count and that elected officials respect the will of their constituents. This system for playing an interactive voter choice card and board game involving strategy and choice is designed to help voters learn how to increase their influence in elections by combining the communication capabilities and organizing potential of computer networks with the consensus-building and agenda-setting databases and tools of this inventor's patented Interactive Voter Choice System (U.S. Pat. No. 7,953,628).

Efforts to increase civic engagement focus largely on reforming existing laws that tend to favor incumbents over challengers. Computer- and web-based initiatives focus largely on enhancing voters' organizing capabilities to master the intricacies of traditional electoral processes and institutions that often thwart voters in the exercise of their sovereignty. Similarly, games that seek to increase citizen engagement focus on helping voters learn more about the traditional electoral processes and institutions that many voters disdain. In contrast, this "system for playing an interactive voter choice game" and the recently patented Interactive Voter Choice System are unique in their goal of helping voters increase their influence over elections and their outcomes without changing any laws or teaching them more about traditional processes and institutions. Their focus is on demonstrating that voters do have an alternative. The databases, agenda-setting and consensus-building tools of the Interactive Voter Choice System enable them to take action before elections take place. With these databases and tools, they can build consensus about their legislative priorities and forge large voting blocs using computer networks like the Internet to foster multiparty communications and organizing among large numbers of people so their blocs and coalitions can garner enough votes to elect candidates to enact voters' legislative agendas.

In a preferred embodiment, a plurality of players using remote devices access a website on the internet comprising a game board, electronic databases and a voting utility. Game participants play the role of voters in a fictive election district seeking to elect a candidate for public office. They choose the district from an election district database containing a pre-set list of districts. The list provides information about each district that is available to all players.

Players compete to develop strategies to set a winning legislative agenda and build a winning voting bloc, and coalitions of voting blocs, to elect a candidate to represent a fictive electoral district and enact the winning bloc's legislative agenda. The voting bloc, or coalition of voting blocs, with the highest number of votes cast for their candidate, is the winner. (Note: the game does not comprise any novel system, method or apparatus for casting or counting votes.)

Each player develops a strategy for setting a legislative agenda and building a winning voting bloc that reflects their own personal legislative priorities, the priorities and prior voting patterns of voters residing in the election district, as well as emerging trends, according to information provided players in an election district database. Their strategy must also manage controllable and uncontrollable events that increase or decrease the votes of their voting bloc that occur as they advance around the game board when they take their turn.

Each player sets a legislative agenda by choosing legislative options from a legislative options database. Each option carries with it a specified number of votes, based on data contained in the election district database regarding voter preferences, prior voting patterns and emerging trends. Players can access this information in the election district database at any time.

The total number of votes of all the options contained in a player's legislative agenda constitute a player's voting bloc. This number changes whenever a player adds and deletes options from their agenda. The total number of votes in a player's voting bloc is known only by the player.

As each player moves around the game board, they add and delete unwanted legislative options from their legislative agenda. These additions and deletions cause their voting bloc to gain or lose votes.

There are several ways players add and subtract legislative options from their legislative agendas, and simultaneously add or subtract votes from their voting blocs:

1. At the start of the game, each player chooses a prescribed number of legislative options from the legislative options database. At least one option is automatically selected from the database at random and added to their agenda.
2. Every time a player takes their turn and rolls the dice to determine how many spaces they can advance around the game board during the turn, they choose a prescribed number of new legislative options from the database. At least one option is automatically selected at random from the database and added to a player's agenda at each turn. Players can discard at least one unwanted option at each turn. Questions and events drawn from a questions and events database may entitle a player to discard additional options.
3. The total vote count of players' voting blocs can go up or down if they land on spaces where they are required to draw cards from the questions and events database that add or subtract votes from their blocs. For example, they might draw a card that entitles them to add new voters to their bloc by holding town halls in their electoral district. Or they might draw a card informing them that their voting bloc has lost votes because their candidate's negative approval ratings have risen sharply after being criticized in a media blitz funded by supporters of an opposing candidate.

In addition, players can draw bonus cards from the questions and events database that entitle them to increase votes attached to a legislative option in their legislative agenda, or delete options that decrease votes. These additions and deletions alter the total vote count of their voting bloc.

4. A player's voting bloc can lose votes when contradictory legislative options are added to their agenda that information in the election district database indicates will cause friction among voters within the bloc and cause the bloc to lose votes. Players will be informed of these contradictions as soon as they occur. The contradictions will be identified automatically by data contained in the election district database, and will result in the subtraction of the votes attached to the contradictory options from their voting bloc's total number of votes. Players can reverse these losses as they move around the game board by discarding options that cause them to lose votes.
5. Players can add votes to their voting bloc by using information they obtain from the election district database and their own legislative preferences to select options and combinations of options that appeal to district voters. Players who select such combinations receive bonus votes, which are added to the total number of votes of their voting blocs.
6. Players can add votes to their voting bloc by creating a coalition of two or more voting blocs. They can access the legislative priorities database to identify and then contact other players whose legislative agendas contain options that are similar to options in their own agendas. They can then communicate with each other electronically to secretly negotiate a merger of their voting blocs into a coalition of voting blocs. By merging their blocs, the votes of each bloc are then combined into a new total for the coalition bloc as a whole. Players can also break up coalitions by negotiating mergers with players in the coalition that cause these players to move out of the coalition. The vote counts of the players and voting blocs involved will be adjusted accordingly.

The winner of the game is determined after one of the players completes at least two tours around the game board and "calls the vote" because the player thinks they have built the voting bloc with the largest number of votes. The player then casts all the votes of their voting bloc. All the other players must follow suit and cast the votes contained in their voting bloc (or coalition of voting blocs). The total number of votes cast by each player, or coalition of players, is electronically calculated and compared. The winner is the player's voting bloc (or players' coalition of voting blocs) which casts the highest number of votes for its candidate to represent the district and enact its legislative agenda.

BRIEF DESCRIPTION OF THE SEVERAL VIEWS OF THE DRAWINGS

FIG. 1 depicts a system for playing an interactive voter choice game.

FIG. 2 depicts a flow chart of players merging their voting blocs into a coalition of voting blocs in a system for playing an interactive voter choice game.

DETAILED DESCRIPTION OF THE INVENTION

Studies show trends toward decreasing voter turnout in most established democracies since the 1960s, accompanied by decreasing voter confidence that their votes in elections make a difference and that elected officials respect the will of their constituents. This invention is designed to help citizens increase their influence over elections and their outcomes by providing voters an amusing multiparty game for learning how to run and elect their own candidates to enact voters' legislative agendas by using core features of the inventor's recently patented Interactive Voter Choice System (U.S. Pat. No. 7,953,628) to set common legislative agendas and build voting blocs and electoral coalitions.

Efforts to increase civic engagement largely focus on reforming existing laws that tend to favor incumbents over challengers. Computer- and web-based initiatives to increase engagement largely focus on enhancing voters' organizing capabilities to master the intricacies of traditional electoral processes and institutions that often thwart voters in the exercise of their sovereignty. Similarly, games that seek to increase citizen engagement largely focus on helping voters learn more about traditional electoral processes and institutions that frustrate voters. They are usually unsuccessful because angry voters resist learning more about electoral processes they already disdain.

This "system for playing an interactive voter choice game" and the Interactive Voter Choice System are unique because they show voters they have a powerful technology-based alternative that enables them to work around electoral processes and institutions that thwart their participation in elections. Moreover, they help voters increase their influence in elections without changing any of the laws that thwart participation, or requiring voters to learn more about traditional processes and institutions that are designed to diminish voters' influence. Instead, their focus is on enabling voters to do something they have been unable to do previously, which is to join forces and, by accessing unique consensus-building and agenda-setting databases to set common legislative agendas and build voting blocs and electoral coalitions to elect their own candidates to enact voters' agendas. They show voters how they can take action before elections take place to build consensus about their legislative priorities and build large voting blocs and coalitions, using computer networks like the Internet, to foster multiparty communications and organizing among large numbers of people so their voting blocs and coalitions can garner the votes they need to elect candidates to enact voters' legislative agendas.

In a preferred embodiment of this system for playing an interactive voter choice card and board game involving strategy and chance, a plurality of competing players at remote terminals access a computer network involving at least a website on the internet, electronic databases and a voting utility, to play the role of voters in a fictive election district. Players compete to develop strategies for setting legislative agendas and building winning voting blocs and coalitions of voting blocs to elect a candidate for public office to represent the election district. The player whose voting bloc casts the highest number of votes for its candidate is the winner. Players who merge their blocs into coalitions of voting blocs and cast the highest number of votes for the coalition bloc's candidate are the winners.

As the players move around the game board, they develop strategies for managing the effects on their legislative agendas and voting blocs of events they control, as well as events they do not control. Their challenge is to use events they control to set a winning legislative agenda and build a winning voting bloc with the highest number of votes cast for its candidate. Each player develops their own strategy for setting a legislative agenda and building a winning voting bloc that reflects their own personal legislative priorities, and the priorities and prior voting patterns of voters residing in the election district, as well as emerging trends, using information provided all players who access the election district database, Players' strategies must add votes to their voting blocs to offset the effects of events they do not control that cause them to lose votes. They can add or lose votes at any time, from the outset of the game as well as after the game begins, as players advance around the game board when they take their turn. For example, players can chose combinations of legislative options that are complementary rather than contradictory, as determined electronically by data contained in the election district database. Complementary combinations of options that attract votes have the advantage of adding bonus votes to their voting blocs. In contrast, players can also lose votes if they choose combinations of options that information in the database shows to be contradictory. For example, a player cannot have one legislative option in their legislative agenda calling for term limits that restrict the number of terms an elected official may serve in a particular elective office, and simultaneously have another option in their agenda opposing term limits.

The electronic databases comprise at least four databases.

1. Election District Database

This computerized database located on a storage device on the network contains a list of election districts from which players choose the district in which they wish to play the game.

It also contains information regarding each district's voters' legislative preferences, prior voting patterns and emerging trends.

2. Legislative Options Database

This computerized database comprises objects located in a storage device on the network, each object representing a legislative option that users can choose to include in their legislative agendas. The objects in the legislative options database, in a preferred embodiment, can be displayed at least as playing cards contained in at least one deck of playing cards. The database can also be searched electronically by keywords.

Each object bears the title of a legislative option, a description of the option, and the number of votes that the option provides to the voting blocs of users who choose to include the object in their legislative agendas. The number of votes is based on data contained in the election district database regarding each district's voters' legislative preferences, prior voting patterns and emerging trends. In a preferred embodiment, each option contains links to computerized information about the option.

(Note that different players can choose the same options from the database. Even if a player chooses a particular option for their agenda, other players can also choose that option.)

The votes conferred by all the legislative options in a player's legislative agenda constitute the total number of votes contained in the player's voting bloc.

The number of votes in a player's voting bloc is known only to that player until the election is called by one of the players and all players cast the votes contained in their voting blocs. At that time, the total number of votes cast by each voting bloc will be revealed to all players when the winner is declared.

3. Legislative Priorities Database

This computerized database located in a storage device on the network contains all the legislative options that players choose to include in their legislative agendas. The options players add to their agendas are continuously and automatically added to this database. Options players delete from their agendas are deleted from this database.

In games with three or more players, a player can query the database to electronically identify and contact players whose legislative agendas contain legislative options similar to their own, for the purpose of negotiating a merger of their respective voting blocs into a coalition of blocs. However, other players will not be aware of the negotiations unless and until they result in a merger of the respective voting blocs into a coalition of voting blocs.

During the negotiations, the negotiating players can decide to eliminate legislative options contained in their respective legislative agendas when they are entitled to discard options.

If there are multiple players involved in negotiations to merge their voting blocs into a coalition, they can use the voting utility to electronically vote on what options to include in a common legislative agenda. They can also use the voting utility to vote on other proposals, e.g. whether to form a coalition of their voting blocs.

4. Questions and Events Database

This computerized database located in a storage device on the network is comprised of objects containing questions or events that add or subtract votes to a player's voting bloc. These objects are chosen at random when a player lands on a space on the game board requiring him to access this database. In a preferred embodiment, these objects may be at least indicia-bearing objects such as a drawing card.

For example, a player might draw a card asking a factual question concerning elections. Players who correctly answer the question are rewarded with the addition of votes to their voting blocs. Incorrect answers result in the subtraction of votes from their voting blocs.

In addition, a player might draw a card which entitles them to add new voters to their bloc by holding town halls in their electoral district to publicize their legislative agenda and attract support for the bloc's electoral candidate.

Or a player might draw a card informing them that their voting bloc has lost votes because their candidate's negative approval ratings have risen sharply after the candidate was criticized in a media blitz funded by supporters of an opposing candidate.

To initiate a game, at least two prospective players from remote terminals accessing the network, and, in a preferred embodiment, the website, must choose the same election district from the election district database containing a pre-set list of districts. The list provides information about each district that is available to all players. It includes information regarding voters' legislative preferences, prior voting patterns and trends. At any time, at the initiation of a game or during a game, players can decide whether to play the game synchronously or asynchronously.

Once a district is selected by two or more players, the game board appears. In a preferred embodiment, the rectangular board is divided at least into plural indicia-bearing spaces located along its perimeter.

To start the game, the players throw electronic dice to determine which player shall go first. Then the players select a prescribed number of legislative options from the legislative options database. These options are automatically added to their legislative agendas. Players do not know what options are contained in the agendas of the other players.

In addition to the legislative options each player chooses from the database, at least one option is automatically chosen at random from the database and added to their agenda. Each player is entitled to discard at least one option every time they take their turn. Questions and events drawn from the questions and events database may entitle a player to discard additional options. However, the discarded options are placed face up on the game board. These options provide competing players clues about the player's strategy for setting a winning legislative agenda.

The legislative options players choose from the legislative options database are also added automatically to the legislative priorities database. Options that players delete from their agendas are simultaneously and automatically deleted from this database. All options contained in all players' agendas are stored in this database. The database can subsequently be queried by players interested in merging their voting blocs with other voting blocs whose legislative agendas contain legislative options similar to their own.

Each option carries a specified number of votes that voters in the district are likely to cast for a candidate who supports that option, based on election district voting data contained in the election district database regarding the legislative preferences and voting patterns of voters residing in the district, as well as emerging trends. The total number of votes attached to each option in a player's legislative agenda is automatically conferred to their voting bloc.

The total number of votes in a player's voting bloc, conferred by the options contained in a player's legislative agenda, is automatically tallied each time a player changes their agenda, either by adding options or subtracting options. The tallies are revealed only to the player.

As players move around the board when it is their turn, they add legislative options to their legislative agenda and votes to their voting bloc, and delete options and lose votes, as follows:

1. They are entitled but not required to draw a prescribed number of new legislative options from the legislative options database every time they take their turn. These options can be chosen on the basis of the player's personal legislative priorities, as well as strategies developed by the player to set a legislative agenda that is likely to appeal to the voters in the player's election district and thereby add votes to the player's voting bloc, according to information the player obtains from the election district database regarding the legislative preferences and voting patterns of voters residing in the district, as well as emerging trends. However, these legislative options can also cause them to lose votes, as follows:

a. If a player has options in their agenda that contradict each other, according to information stored in the election district database, they lose all the votes attached to all the options. They can overcome this loss by discarding options that caused them to lose votes. A player is allowed to discard at least one option at each turn. However, questions and events drawn from the questions and events database may entitle a player to discard additional options.

b. A player's voting bloc can lose votes when contradictory options are added to their agenda that cause friction among voters within the bloc, based on information contained in the election district database. Such contradictions will be identified automatically and subtracted from their voting bloc's total number of votes. Players can reverse these losses in by discarding options that caused them to lose votes.

2. Players can add votes to their voting bloc by using data from the election district database and their own legislative preferences to select options and combinations of options that appealed to voters in past elections, and which data in the database show to be aligned with emerging trends. Players who select such combinations receive bonus votes, which are added to their voting bloc's total number of votes.

3. Players can land on spaces that entitle them to choose a card from the questions and events database that affect both their legislative agendas and the total votes of their voting bloc.

For example, a player might be asked a factual political question. Players who correctly answer the question are rewarded with the addition of bonus votes to their voting blocs. However, incorrect answers will result in the subtraction of votes from their voting blocs.

In addition, a player might draw a card which entitles them to add new voters to their bloc by holding town halls in their electoral district to publicize their legislative agenda and attract support for the bloc's electoral candidate.

Conversely, a player might draw a card informing them that their voting bloc has lost votes because their candidate's negative approval ratings have risen sharply after the candidate was criticized in a media blitz funded by supporters of an opposing candidate.

4. Players can add votes to their voting blocs by building a coalition of two or more voting blocs. A player can access the legislative priorities database to identify and then electronically contact other players whose legislative agendas contain options that are similar to their own to see whether they are interested in merging their respective blocs into a coalition of voting blocs.

The player can then secretly negotiate with another player, or players, a merger of their legislative agendas and voting blocs into a coalition. During the negotiations, they can see how many votes they would each gain or lose by forging a coalition, which would occur if they have contradictory legislative options in their legislative agendas. If necessary, depending on their respective individual legislative priorities and strategies for building a winning legislative agenda and voting bloc, they can agree to delete legislative options from their common agenda when they are entitled to discard options.

When the players reach an agreement to merge their voting blocs, the votes of each bloc are then combined into a new total for the coalition bloc. Competing players will not be informed of the coalition of the vote count of the coalition bloc until the negotiations are completed.

Any player is entitled to initiate a merger negotiation with another player, if that player is on the list received in response to a query of the legislative priorities database, even if that player is already a member of a coalition. If the respective players decide to merge their voting blocs, the player who was already part of an existing coalition then moves out of that coalition into the new coalition. The respective votes of all blocs are then adjusted to reflect the new vote totals.

Calling the Election

To determine the winner of the game, a player who has completed at least two entire tours of the game board may "call the election" if they think they have built a voting bloc that has more votes than any other player's bloc. Similarly, players belonging to a coalition of voting blocs can call the election if they think that their bloc has more votes than any other bloc.

Once the election is called, each player (or players belong to coalitions of voting blocs) must electronically cast the votes of their voting bloc on behalf of their candidate to represent the electoral district. The respective votes cast by each bloc will be automatically compared electronically to ascertain which bloc cast the highest number of votes for its candidate. The player with the highest number of votes will be declared the winner. The votes cast by coalition blocs are counted as one bloc. The players belonging to a coalition bloc that casts the highest number of votes will be declared the winners.

(Note: the game does not involve any system, method or apparatus relating to how votes are cast or counted.)

What is claimed is:

1. A system for playing an interactive voter choice game to elect a candidate for public office in a fictive election district, comprising:

a plurality of remote user terminals;

a rectangular game board displayed on the user terminals, said game board divided into a plurality of indicia-bearing spaces located along its perimeter comprising game pieces, dice, drawing cards, and indicia-bearing cards in card decks displaying legislative options, said game board configured for access by remote user terminals, said user terminals configured to allow players to move around spaces of said game board their game pieces representing each player after throwing dice to determine how many spaces a player may advance at each turn;

a computer network, wherein the network comprises at least the Internet and a website on the Internet, said network and website configured for access by a plurality of remote user terminals to access the game board, game pieces, dice, drawing cards and card decks to play the game;

a computerized election district database of objects located in a storage device on the network, comprising a list of fictive election districts;

said computerized election district database is further configured to comprise data regarding the legislative preferences of voters and prior voting patterns of voters residing in each fictive election district, and emerging trends;

said user terminals are configured to periodically access said election district database to select an election district from said list in which users wish to play the game;

said user terminals are configured to periodically access said election district database to review said election district data;

a computerized legislative options database of objects located in a storage device on the network, each object representing a legislative option available to users for inclusion in users' legislative agendas;

each of the said legislative options in said computerized legislative options database contains the number of votes that the option will elicit from voters residing in the district who favor the option, according to data from the said election district database;

said user terminals are configured to periodically access the network to choose legislative options from the computerized legislative options database to create legislative agendas and voting blocs of voters favoring the options, or delete chosen options from their agendas and blocs;

said user terminals are configured to transmit the legislative options chosen by users from the computerized legislative options database to users' legislative agendas and voting blocs;

said user terminals are configured to transmit to a computerized legislative priorities database located in a storage device on the network the legislative options contained in users' legislative agendas;

said legislative priorities database is further configured to continuously tally changes in the total number of votes contained in users' legislative agendas and voting blocs;

said legislative priorities database is further configured to continuously display on said user terminals changes in the total number of votes contained in users' legislative agendas and voting blocs;

said user terminals are configured to periodically query the computerized legislative priorities database to identify users whose legislative agendas contain legislative options similar to the legislative options contained in querying users' legislative agendas;

said computerized legislative priorities database comprised of subsets of objects from the legislative options database is further configured to transmit to querying users' terminals a list responsive to their query;

said user terminals configured to query the legislative priorities database and identify users with legislative options in their legislative agendas that are statistically similar to the querying users' legislative options are further configured to contact the user terminals of users on the said list with similar legislative options, to negotiate merging the respective users' legislative agendas and voting blocs;

a computerized questions and events database of objects located in a storage device on the network, each object adding votes to users' voting blocs or subtracting votes from users' voting blocs;

said user terminals are further configured to draw objects from the questions and events database that add or subtract votes from the users' voting blocs;

said user terminals are further configured to transmit to the legislative priorities database the objects from the questions and events database that add or subtract votes from users' voting blocs;

Said legislative priorities database is further configured to tally votes cast by users' voting blocs after the election is called to determine who wins the election.

2. The system of claim 1, wherein the election district database is further configured to display on user terminals data regarding the election district selected by users playing the game.

3. The system of claim 1, wherein said game board is further configured to enable voters to throw electronic dice to determine how many spaces to advance at each turn.

4. The system of claim 1, wherein said user terminals are configured to periodically access the said network to choose legislative options from said computerized legislative options database to create legislative agendas and voting blocs of voters favoring the options, or delete chosen options from their agendas and blocs.

5. The system of claim 1, wherein said legislative options database of objects is further configured to display the objects on user terminals at least as indicia-bearing devices using digital media, and auditory, visual and textual metaphors.

6. The system of claim 1, wherein said computerized legislative options database is further configured for said legislative options electronically selected at random to be added to said users' legislative agendas.

7. The system of claim 1, wherein legislative options contained in users' legislative agendas may be discarded.

8. The system of claim 1, wherein said legislative options discarded by users may be viewed by all users.

9. The system of claim 1, wherein the legislative options database is further configured to display on each of said users terminals the number of votes conferred by the legislative options contained in each user's legislative agenda.

10. The system of claim 1, wherein said legislative options database is further configured to transmit the said legislative options contained in said users' legislative agendas to said legislative priorities database.

11. The system of claim 1, wherein said legislative priorities database is further configured to privately display on each user's terminal the total number of votes conferred to each option in the user's legislative agenda and the total number of votes conferred to each user's voting blocs by the legislative options contained in the user's legislative agenda.

12. The system of claim 1, wherein user terminals are further configured to access said questions and events database to choose objects from said database which add votes to users' voting blocs or subtract votes from users' voting blocs.

13. The system of claim 1, wherein said legislative priorities database is further configured to privately display the number of votes added to each user's legislative agenda and voting bloc by objects drawn from the questions and events database.

14. The system of claim 1, wherein said user terminals are configured to periodically query via the network the computerized legislative priorities database to identify users who have chosen legislative options that are statistically similar to the querying users' chosen legislative options transmitted to the legislative priorities database.

15. The system of claim 1, wherein said computerized legislative priorities database is further configured to transmit to user terminals of querying users' a list responsive to the query.

16. The system of claim 1, wherein said user terminals of users querying the legislative priorities database and users named on said list responsive to users' queries are further configured to enable said users to communicate with each other electronically to negotiate merging their voting blocs into a coalition of voting blocs.

17. The system of claim 1, wherein said legislative priorities database is further configured to combine the legislative agendas and calculate the votes of a coalition of voting blocs.

18. The system of claim 1, wherein said user terminals are further configured to enable users to "call the game" wherein all users are required to cast the votes of their voting blocs for their candidates.

19. The system of claim 1, wherein said legislative priorities database is further configured to determine which user's voting bloc has won the game by casting the highest number of votes for their candidate.

20. The system of claim 1, wherein said game board is further configured to visually display said users moving around the game board to access said databases to add and delete legislative options from their legislative agendas and add and subtract votes from their voting blocs.

* * * * *